United States Patent
Huang

(10) Patent No.: US 8,467,945 B2
(45) Date of Patent: Jun. 18, 2013

(54) CONSTANT SPEED CONTROL METHOD FOR VEHICLE AND DEVICE THEREOF

(75) Inventor: Yu-jen Huang, Tainan (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 321 days.

(21) Appl. No.: 12/950,920

(22) Filed: Nov. 19, 2010

(65) Prior Publication Data
US 2011/0130930 A1   Jun. 2, 2011

(30) Foreign Application Priority Data
Nov. 27, 2009  (TW) .................. 98140582 A

(51) Int. Cl.
*B60K 41/12* (2006.01)
*B60W 30/14* (2006.01)
*G06F 9/44* (2006.01)

(52) U.S. Cl.
USPC .................. 701/54; 701/95; 701/93; 477/37

(58) Field of Classification Search
USPC ............ 701/54, 93, 95, 61, 55, 56; 477/37, 477/62, 174; 475/5, 150; 474/69
See application file for complete search history.

(56) References Cited

U.S. PATENT DOCUMENTS

| 5,031,715 | A | * | 7/1991 | Ogawa et al. ............ 180/179 |
| 5,697,866 | A | * | 12/1997 | Okahara ............... 477/169 |
| 6,188,943 | B1 | * | 2/2001 | Uchida et al. ............ 701/54 |
| 6,282,484 | B1 | * | 8/2001 | Enomoto et al. ........... 701/97 |
| 6,306,061 | B1 | * | 10/2001 | Inamura et al. ........... 477/45 |
| 7,890,237 | B2 | * | 2/2011 | Kuwahara et al. .......... 701/51 |
| 2012/0122628 | A1 | * | 5/2012 | Frank et al. .............. 477/3 |

FOREIGN PATENT DOCUMENTS
TW   I312325   7/2009

* cited by examiner

*Primary Examiner* — Tan Q Nguyen
(74) *Attorney, Agent, or Firm* — Cheng-Ju Chiang

(57) ABSTRACT

A constant speed control method for a vehicle and a device thereof are disclosed. The constant speed control method includes steps of: firstly examining if a constant speed switch of the vehicle is pressed by an electronic control unit; allowing the electronic control unit to enter a constant speed mode when the constant speed switch is pressed; and sending a signal by the electronic control unit, so as to lock a throttle locking device for maintaining an opening degree of a throttle valve, and to adjust an transmission ratio of an electric continuously variable transmission (ECVT) for maintaining the constant speed driving of the vehicle. The present invention is further related to a constant speed control device for implementing the above method.

7 Claims, 8 Drawing Sheets

CONSTANT SPEED CONTROL METHOD FOR VEHICLE AND DEVICE THEREOF

FIELD OF THE INVENTION

The present invention relates to a constant speed control method and a device thereof, and more particularly to a constant speed control method and a device thereof that adjust a transmission ratio of an electric continuously variable transmission (ECVT) to control a motor for maintaining constant speed driving of the vehicle.

BACKGROUND OF THE INVENTION

Most of conventional constant speed control methods for a vehicle use an electronic control unit to control an opening degree of a throttle valve for maintaining a constant speed of the vehicle. For example, Taiwanese patent issued No. I312325, which was filed by the applicant, discloses a constant speed device for a scooter and a constant speed cruise program applying thereto. With reference to FIG. 8, when a scooter driver presses a constant speed on/off switch, a controller detects all kinds of data. When determining the speed of the scooter is lower than a constant speed, the controller adjusts a throttle valve and a fuel nozzle to increase air flow and fuel sent to a combustion chamber. On the other hand, when determining the speed of the scooter is higher than the constant speed, the controller reversely adjusts the throttle valve and the fuel nozzle to decrease the air flow and fuel sent to the combustion chamber.

However, when being putting into practical use, the foregoing constant speed device for a scooter and the constant speed cruise program applying thereto still have the following problems: when the constant speed device for a scooter adjusts the opening degree of the throttle valve and the fuel nozzle to change the air flow and the fuel sent into the combustion chamber for maintaining the speed of the scooter, a rotation speed of an engine of the scooter will fluctuate that the fuel in the combustion chamber will not achieve the best combustion efficiency due to the sudden variation of the rotation speed of the engine. As a result, even though the conventional constant speed device for a scooter can achieve an objective of maintaining constant speed cruise, the fuel consumption is simultaneously raised.

Hence, it is necessary to provide a constant speed control method and a device thereof to overcome the problems existing in the conventional technology.

SUMMARY OF THE INVENTION

A primary object of the invention is to provide a constant speed control method for a vehicle which includes steps of: firstly examining whether a constant speed switch of the vehicle is pressed or not by an electronic control unit, and allowing the electronic control unit to enter a constant speed mode when the constant speed switch is pressed; and sending a signal by the electronic control unit, so as to lock a throttle locking device for maintaining an opening degree of a throttle valve, and to adjust an transmission ratio of an ECVT (Electric Continuously Variable Transmission) for maintaining the constant speed driving of the vehicle with better combusting efficiency.

A secondary object of the present invention is to provide a constant speed control device for a vehicle which has an electronic control unit, an ECVT, a constant speed switch, a speed sensor and a throttle locking device. When the constant speed switch is pressed, the electronic control unit locks the throttle locking device for maintaining an opening degree of a throttle valve, and adjusts a transmission ratio of the ECVT, with the result that the vehicle can move at a constant speed with better combusting efficiency.

In one embodiment of the present invention, before entering the constant speed mode, the method further includes a step of: examining if a vehicle speed measured by a vehicle speed sensing device is in a predetermined range and entering the constant speed mode when the speed is in the predetermined range.

In one embodiment of the present invention, the ECVT has a transmission-ratio control motor and a pulley assembly, and the electronic control unit examines if the vehicle speed is higher or lower than a constant speed value, wherein the transmission-ratio control motor adjusts the pulley assembly to a low transmission ratio when the vehicle speed is higher than the constant speed value; or the transmission-ratio control motor adjusts the pulley assembly to a high transmission ratio when the vehicle speed is lower than the constant speed value.

In one embodiment of the present invention, the method further has a step of: examining if an accelerator opening-degree sensing device sends an accelerator opening degree signal by the electronic control unit, and quitting the constant speed mode when variation of the opening degree is larger than a default value.

In one embodiment of the present invention, the method further has a step of: examining whether a brake switch is activated or not by the electronic control unit, and quitting the constant speed mode when the brake switch is activated.

In one embodiment of the present invention, the method further has a step of: examining if a constant speed switch is pressed again by the electronic control unit, and quitting the constant speed mode when the constant speed switch is pressed again.

In one embodiment of the present invention, the ECVT has a transmission-ratio control motor and a pulley assembly.

In one embodiment of the present invention, the pulley assembly has a first pulley and a second pulley; the transmission-ratio control motor is used to adjust the first pulley, so as to adjust a ratio of the first pulley relative to the second pulley.

In one embodiment of the present invention, the constant speed control device for a vehicle further has a brake switch and a display device that are electrically connected to the electronic control unit, respectively.

DETAILED DESCRIPTION OF THE PREFERRED EMBODIMENTS

The foregoing objects, features and advantages adopted by the present invention can be best understood by referring to the following detailed description of the preferred embodiments and the accompanying drawings.

Figure 1:
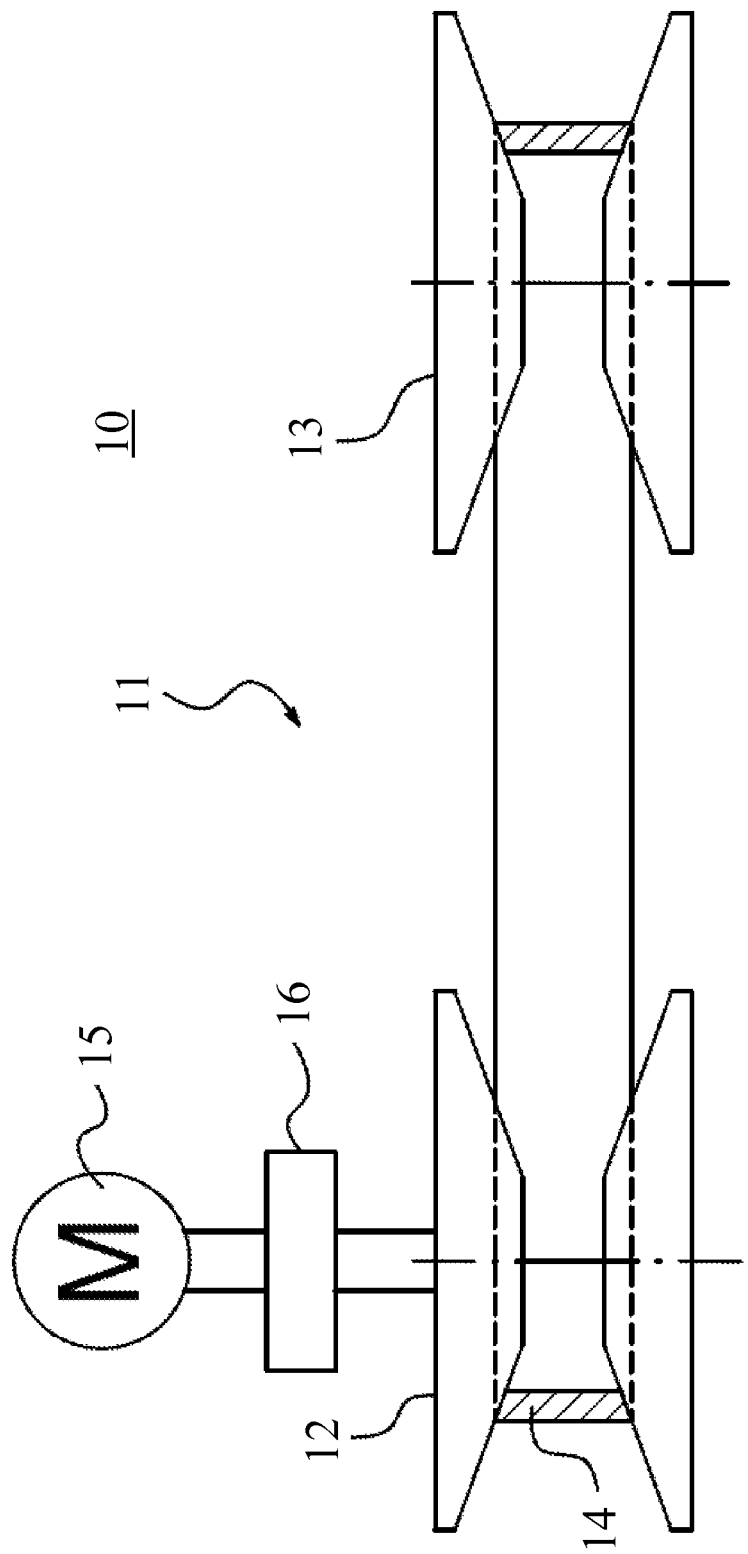
FIG. 1 is a structural schematic view of an ECVT of a constant speed control device for a vehicle according to the present invention.

With reference to FIG. 1, a structural schematic view of an ECVT of a constant speed control device for a vehicle according to a preferred embodiment of the present invention is illustrated, wherein the ECVT (Electric Continuously Variable Transmission) is a type of transmission device generally used in vehicles including modern automobiles or scooters. A conventional ECVT automatically adjusts transmission ratio of a pulley assembly only by sensing torque and resistance, wherein a method of controlling the conventional ECVT is different from the method of controlling an ECVT 10 in accordance with the present invention. The ECVT 10 used in the constant speed control device for a vehicle in accordance with the present invention comprises a pulley assembly 11 and a transmission-ratio control motor 15, wherein the pulley assembly 11 further has a first pulley 12 and a second pulley 13. Each of the first and second pulleys 12, 13 is a variable-pitch pulley assembled by a pair of tapered faceplates opposite to each other. Furthermore, a belt 14 is attached to the first and second pulleys 12, 13, so as to transfer a dynamic force of the first pulley 12 to the second pulley 13. The belt 14 is commonly named and is not limited only to leather material, and can be constructed of leather, rubber, and a mixture of rubber and textile or can be made of metal.

With reference to FIG. 1 again, the transmission-ratio control motor 15 is used to drive one of the faceplates of the first pulley 12 by rotation via a reducing gear assembly 16, so as to change the pitch of the first pulley 12. The transmission-ratio control motor 15 may be any type of motor, such as a DC motor, an AC motor, a brushed or brushless motor or a servo motor. When the pitch of the first pulley 12 is changed, the second pulley 13 will be pushed by a spring or a weight roller to automatically adjust the pitch thereof to maintain a certain tension force of the belt 14, and what is mentioned is a common structure of ECVT which thus will no longer be discussed in detail. When the transmission-ratio control motor 15 rotates in a forward direction or a reversed direction, the transmission ratio of the first and second pulleys 12, 13 will be changed accordingly, so as to achieve an object of continuous variable transmission. The so-called transmission ratio is a rotation-number ratio of the first pulley 12 to the second pulley 13.

Figure 2:
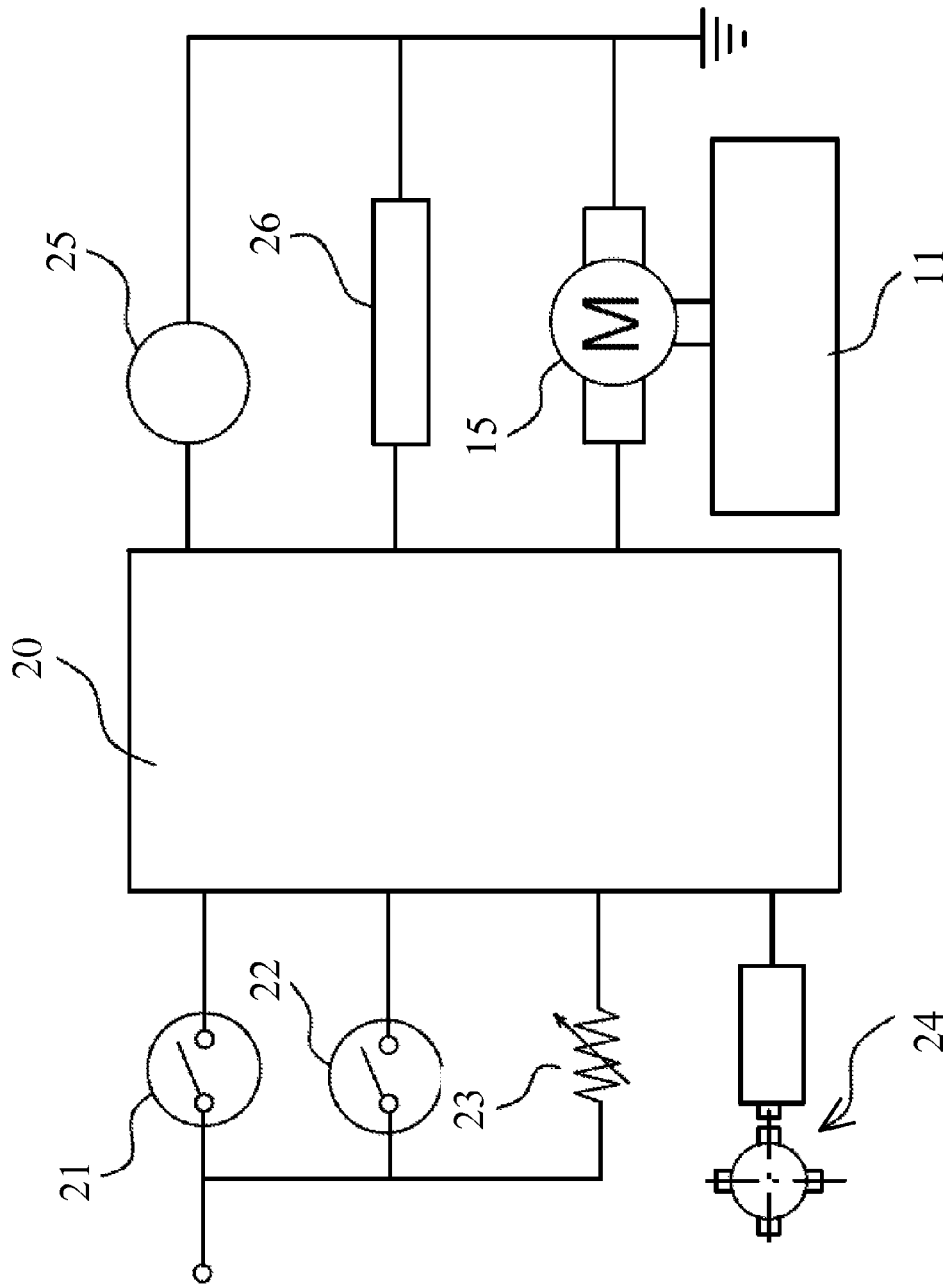
FIG. 2 is a schematic view of an electric circuit of the constant speed control device for a vehicle according to the present invention.
Figure 3:
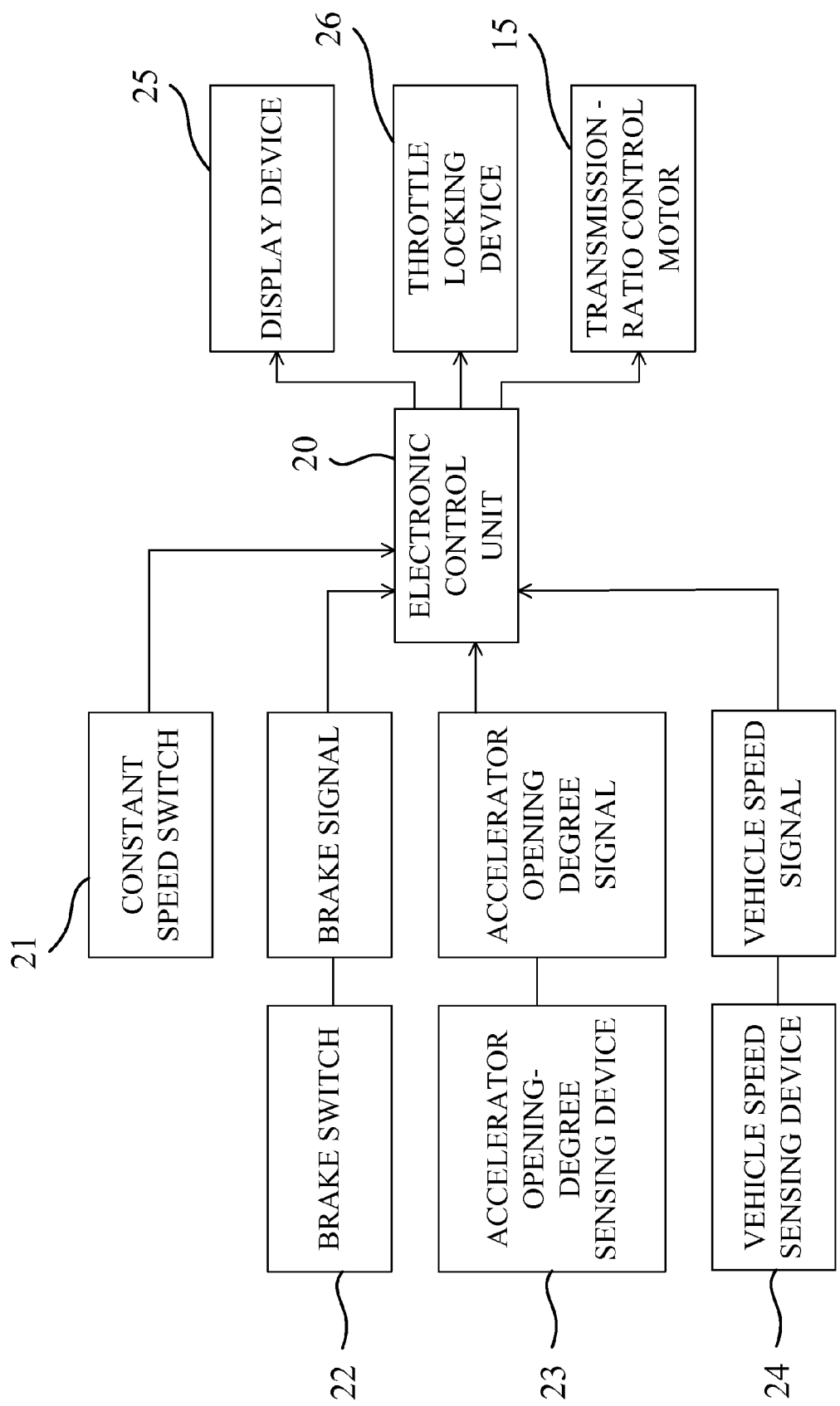
FIG. 3 is a schematic view of functional blocks of the constant speed control device for a vehicle according to the present invention.

With further reference to FIGS. 2 and 3, FIG. 2 is a schematic view of an electric circuit of the constant speed control device for a vehicle according to the preferred embodiment of the present invention, and FIG. 3 is a schematic view of functional blocks of the constant speed control device for a vehicle according to the present invention. The constant speed control device has an electronic control unit 20, a constant speed switch 21, a brake switch 22, an accelerator opening-degree sensing device 23, a vehicle speed sensing device 24, a display device 25, a throttle locking device 26 and a transmission-ratio control motor 15. The electronic control unit 20 is electrically connected to the constant speed switch 21, the brake switch 22, the accelerator opening-degree sensing device 23, the vehicle speed sensing device 24, the display device 25, the throttle locking device 26 and the transmission-ratio control motor 15. The electronic control unit (also called ECU) 20 is a processor which receives and processes a signal from the constant speed switch 21, a brake signal 221 of the brake switch 22, an accelerator opening-degree signal 231 from the accelerator opening-degree sensing device 23 and/or a vehicle speed signal 241 from the vehicle speed sensing device 24, so as to output corresponding control signals for controlling the display device 25, the throttle locking device 26 and/or the transmission-ratio control motor 15, wherein rotation of the transmission-ratio control motor 15 can adjust transmission ratio of the first and second pulleys 12, 13 of the pulley assembly 11. The constant speed switch 21 may be an electronic switch, such as a button switch, a contact switch or a toggle switch.

Figure 4:
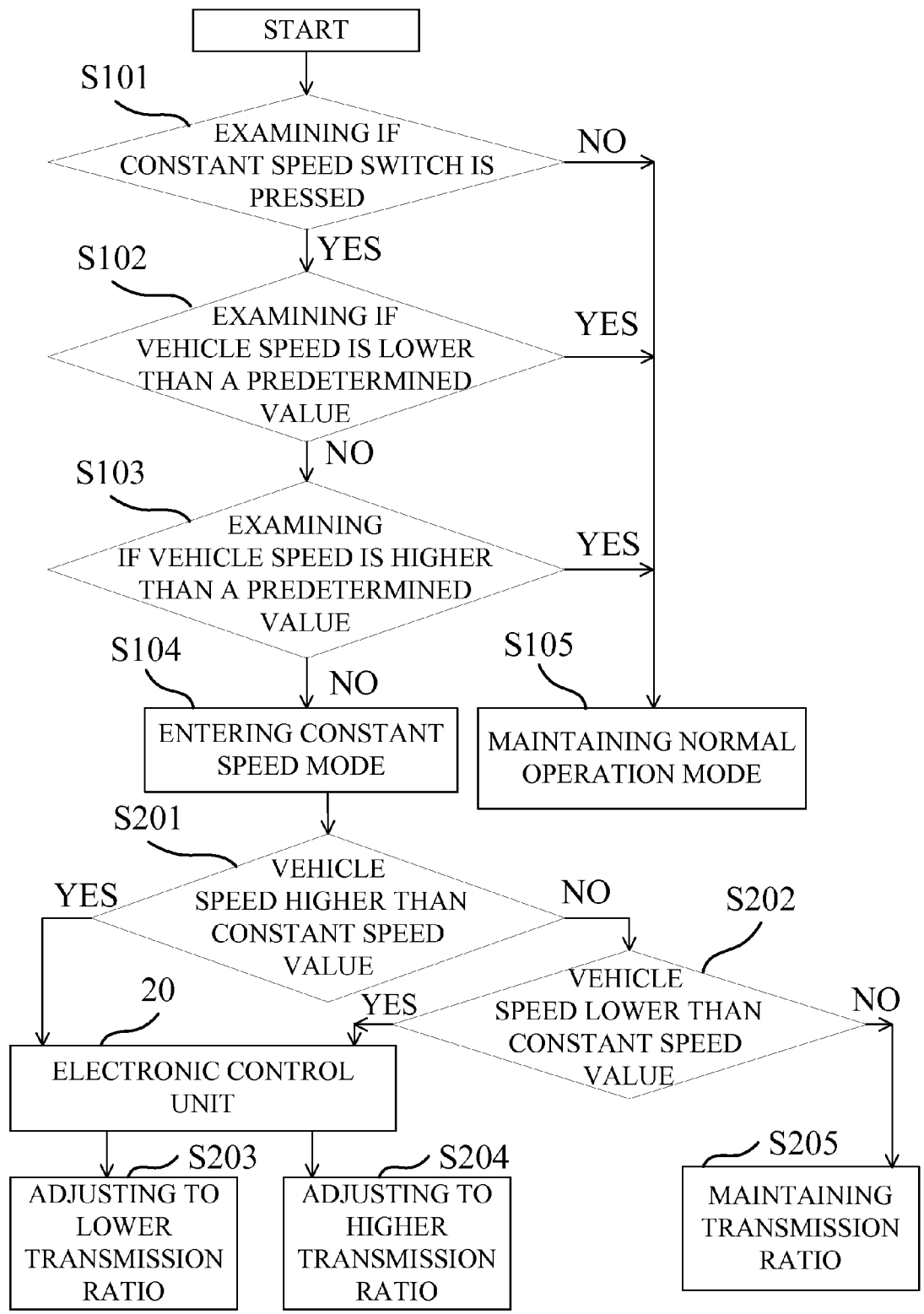
FIG. 4 is a flow chart for mode selection and transmission ratio adjustment of a constant speed control method for a vehicle according to a preferred embodiment of the present invention.
Figure 5:
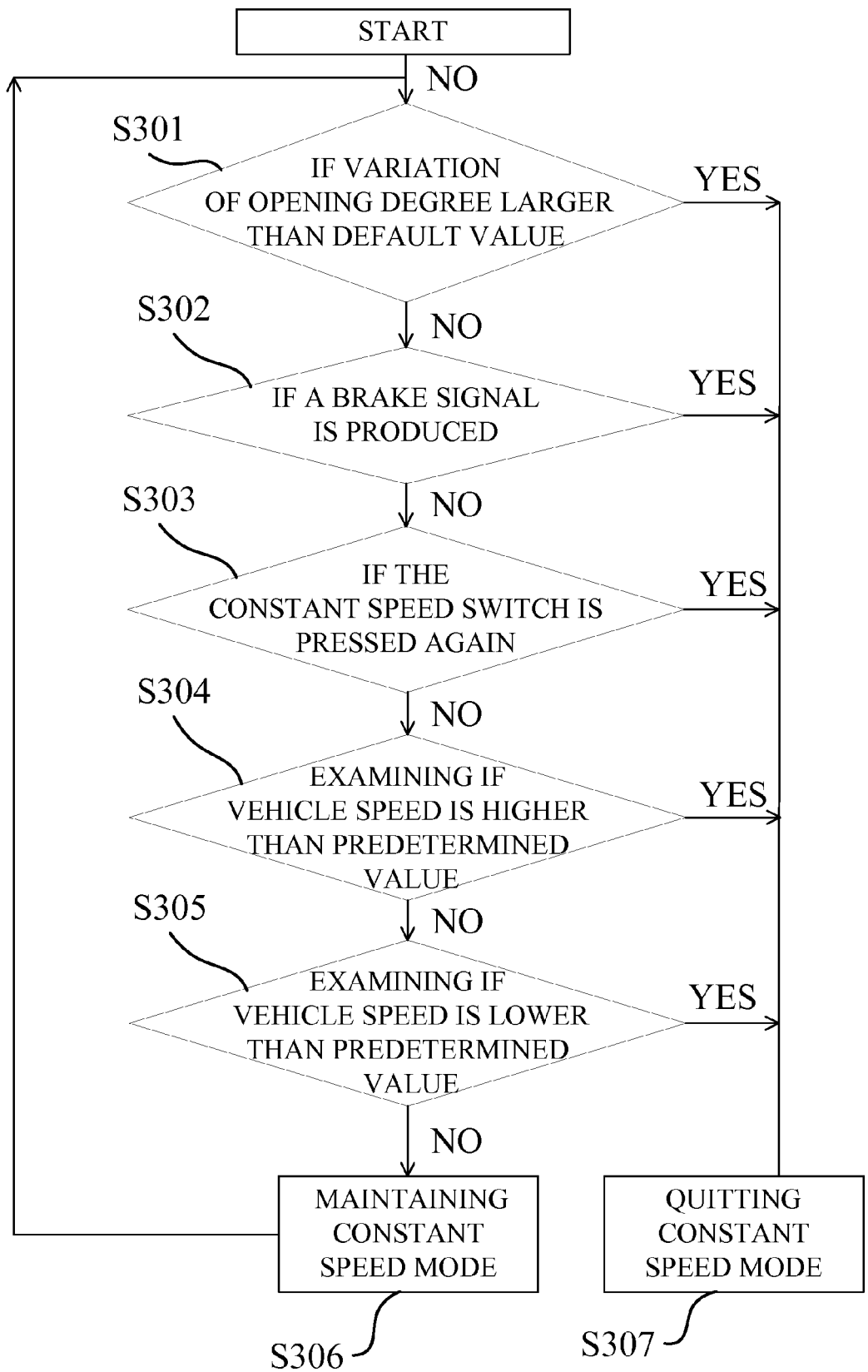
FIG. 5 is a flow chart for mode quitting of the constant speed control method for a vehicle according to the present invention.

With reference to FIGS. 2, 3 and 4, FIG. 4 further discloses a flow chart for mode selection and transmission ratio adjustment of a constant speed control method for a vehicle according to a preferred embodiment of the present invention. The present invention will describe each step of selection executed by the electronic control unit 20 for entering a constant speed mode by referring to the following detailed description:

In a step S101, the electronic control unit 20 firstly examines whether the constant speed switch 21 is pressed or not. When the electronic control unit 20 examines the constant speed switch 21 is still not pressed, the vehicle will maintain a normal operation mode (i.e. a Step S105), wherein the so-called normal operation mode of the present invention means the speed of the vehicle is controlled by traditional method of changing an opening degree of an accelerator. When a driver intends to speed the vehicle, the driver will increase the opening degree of the accelerator to raise rotation speed of an engine (an accelerator opening degree control device for a scooter is generally a throttle handle, while that for an automobile is a throttle pedal), wherein the ECVT 10 automatically adjusts transmission ratio of the pulley assembly 11 by sensing torque and resistance. Otherwise, when the driver intends to slow the vehicle, the driver will reduce the opening degree of the accelerator to lower the rotation speed of the engine. When the electronic control unit 20 examines the constant speed switch 21 is pressed, then going to a step S102.

In the step S102, the electronic control unit 20 examines if a vehicle speed signal 241 sent from the vehicle speed sensing device 24 is lower than a predetermined value. When the vehicle speed is relatively low, the engine is generally in an unstable idle speed, and the transmission ratio of the pulley assembly 11 of the ECVT 10 might also reach to a critical value. Therefore, it is necessary for setting a lowest vehicle speed value to enter a constant speed mode, so as to prevent blow-out of the engine or prevent rotation of the transmission-ratio control motor 15 from being out of the critical value. The lowest vehicle speed value may be 10 km or 20 km, but is not limited thereto. When the electronic control unit 20 examines the vehicle speed signal 241 is lower than the lowest vehicle speed value for entering the constant speed mode, the vehicle is maintained to be in the normal operation mode (i.e. the step S105); or when the electronic control unit 20 examines the vehicle speed signal 241 is not lower than this predetermined value, then going to a step S103.

In the step S103, the electronic control unit 20 examines if the vehicle speed signal 241 sent from the vehicle speed sensing device 24 is higher than another predetermined value. When the vehicle speed is too high, entering the constant speed mode might lead to safety problems, and the transmission ratio of the pulley assembly 11 of the ECVT 10 might also reach to a critical value. Therefore, it is necessary for setting a highest vehicle speed value to enter the constant speed mode, so as to prevent rotation of the transmission-ratio control motor 15 from being out of the critical value. The highest vehicle speed value may be 50 km or 100 km, but is not limited thereto. When the electronic control unit 20 examines the vehicle speed signal 241 is higher than the highest vehicle speed value, the vehicle is maintained to be in the normal operation mode (i.e. the step S105); when the electronic control unit 20 examines the vehicle speed signal 241 is not higher than this predetermined value, then entering the constant speed mode (i.e. a step S104) and displaying a state of the constant speed mode on the display device 25, wherein the display device 25 can be selected from an independent signal light or a sign signal light in an instrument panel of the vehicle.

In the constant speed mode, the electronic control unit 20 sends a signal to lock the throttle locking device 26, wherein the throttle locking device 26 may be an electronic throttle or a mechanical throttle. The object of locking the throttle locking device 26 is to keep the opening degree of a throttle of the vehicle constant, so as to keep a constant rotation speed of the engine. Since various engines differs in best-efficiency rotation speed, for example, the best-efficiency rotation speed of an automobile may be ranged between 1500 RPM to 4000 RPM (revolutions per minute); the best-efficiency rotation speed of a scooter may be ranged between 1800 RPM to 6000 RPM, the predetermined rotation speed of the engine set by the electronic control unit 20 of the present invention may not only be set to a best-efficiency rotation speed (not limited to the aforementioned revolutions), but also can be lock to a rotation speed at the time when the constant speed switch 21 is pressed, or the locking predetermined value of the throttle locking device 26 can be set by using an adjustable means. The throttle locking device 26 may control the throttle of the vehicle through a solenoid valve or a servo motor.

Figure 6:
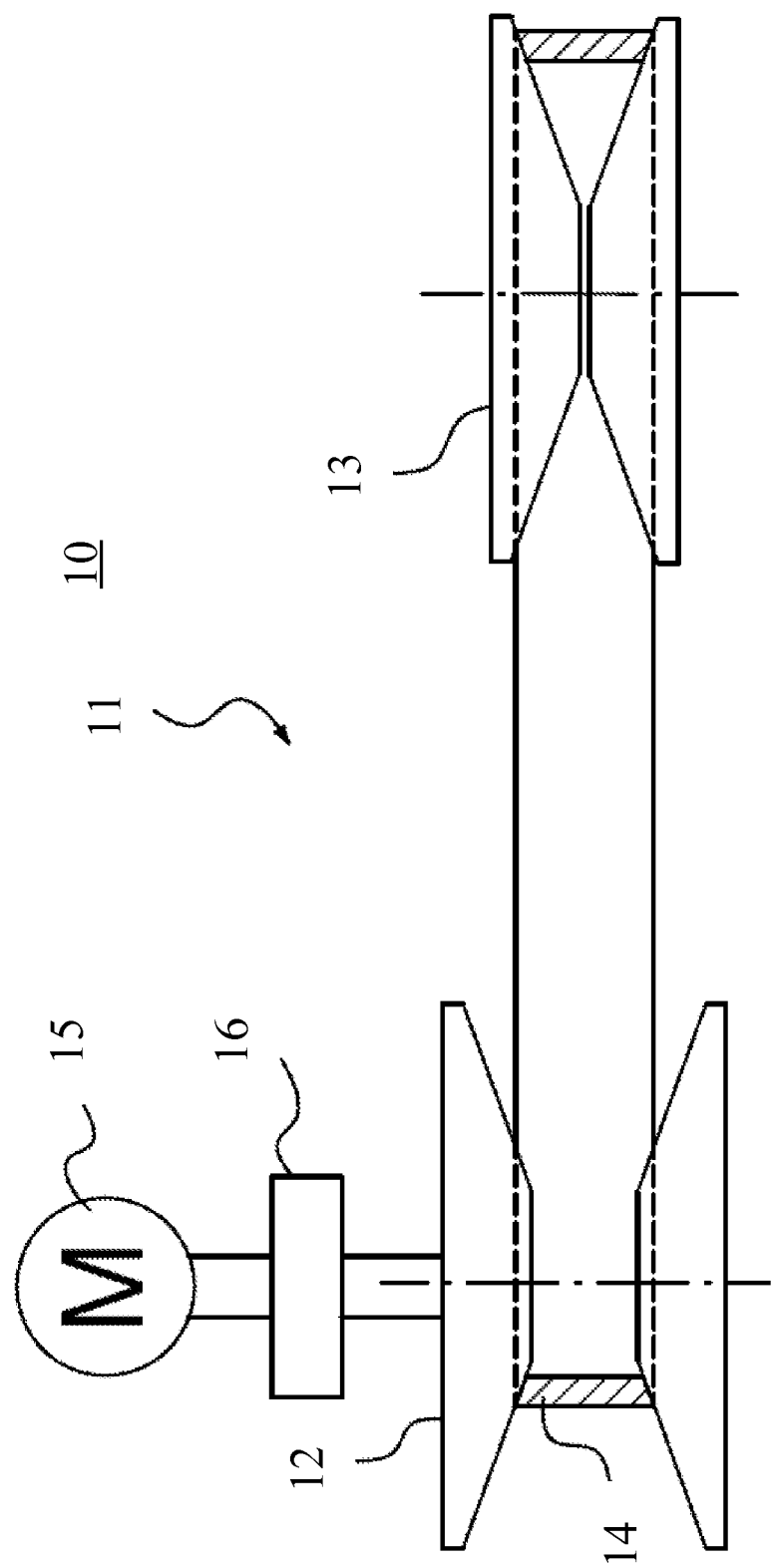
FIG. 6 is a schematic view of actions of lowering transmission ratio of the ECVT of the constant speed control device for a vehicle according to the present invention.

When the vehicle enters the constant speed mode in accordance with the present invention (i.e. the step S104), the electronic control unit 20 keeps examining the vehicle speed signal 241. In a step S201, when the electronic control unit 20 examines the vehicle speed signal 241 is higher than a constant speed value, the electronic control unit 20 will send a signal to adjust the transmission-ratio control motor 15 to lower the transmission ratio (i.e. a step S203), and basically keep sending stable air flow and fuel into an engine combustion chamber in the meantime. With reference to FIG. 6, a schematic view of actions of lowering transmission ratio of the ECVT of the constant speed control device for a vehicle according to the present invention is illustrated. The first pulley 12 is adjusted to a smaller pitch, and in the meantime the second pulley 13 is automatically adjusted to a larger pitch. In the embodiment, when the electronic control unit 20 sends a signal to adjust the transmission-ratio control motor 15 to lower transmission ratio (i.e. the step S203), the transmission-ratio control motor 15 continues adjusting the first pulley 12 to smaller pitch, and the process of the method returns to step S201. If the electronic control unit 20 examines that the vehicle speed signal 241 is not higher than the constant speed value, then going to a step S202.

Figure 7:
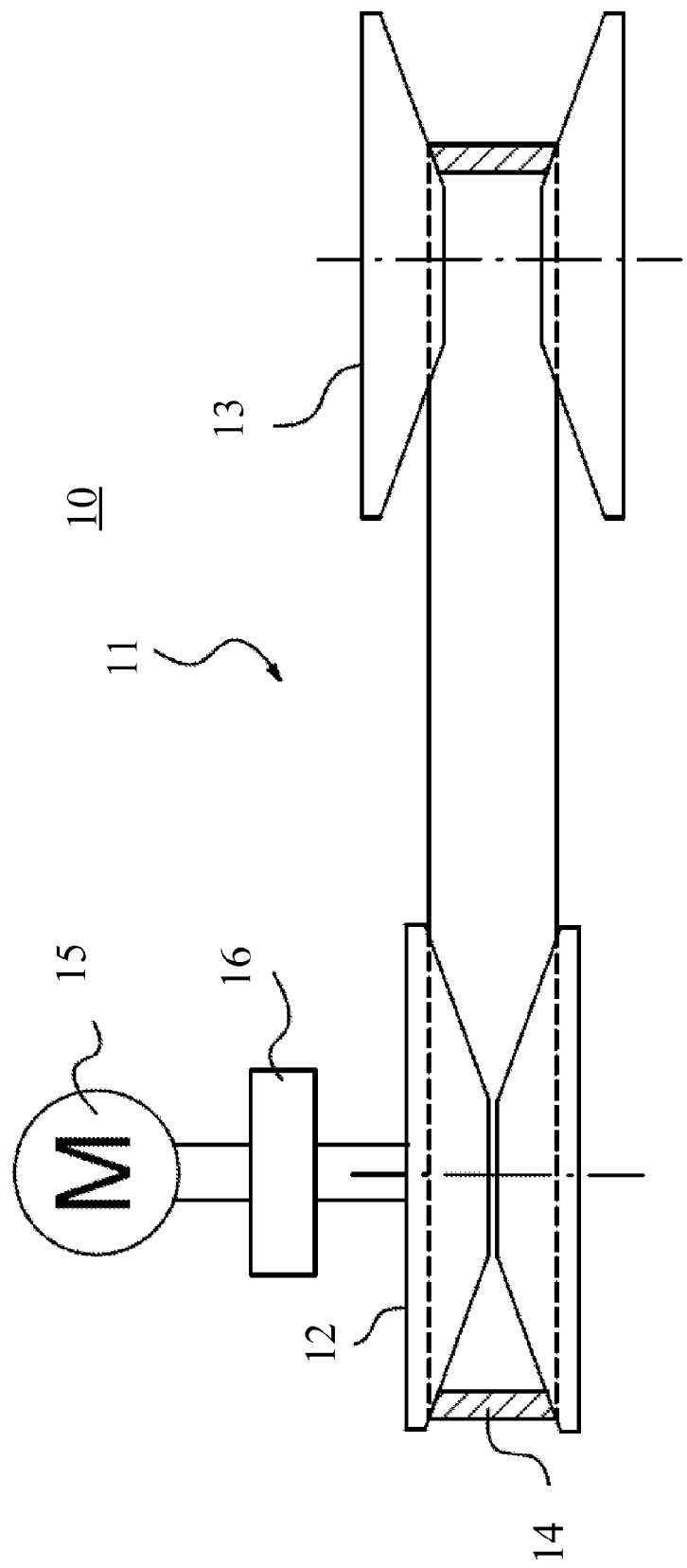
FIG. 7 is a schematic view of actions of lowering transmission ratio of the ECVT of the constant speed control device for a vehicle according to the present invention.
Figure 8:
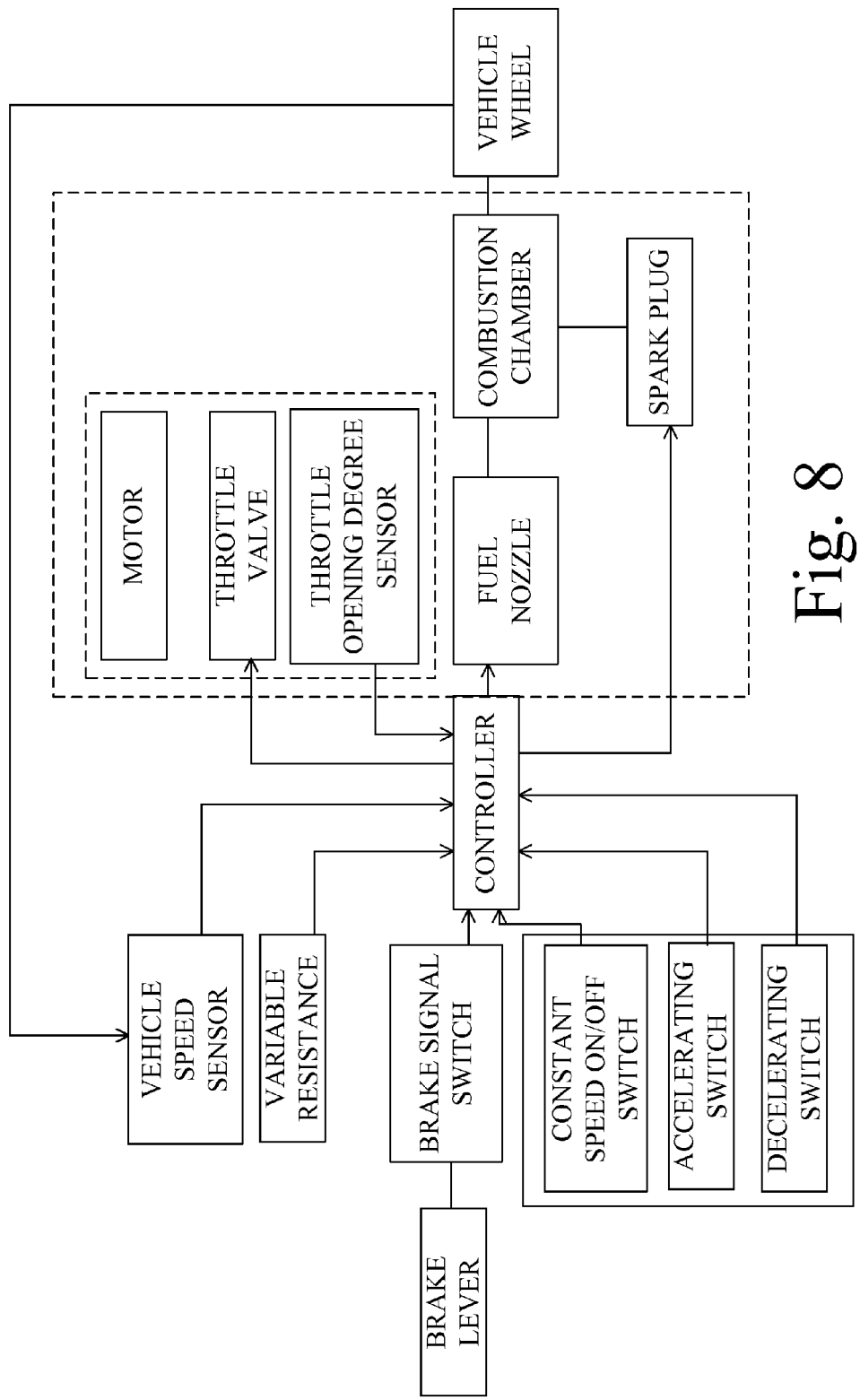
FIG. 8 is a schematic view of functional block of a conventional constant speed device for a scooter.

In the step S202, when the electronic control unit 20 examines the vehicle speed signal 241 from the vehicle speed sensing device 24 is lower than the constant speed value, the electronic control unit 20 then sends a signal to adjust the transmission-ratio control motor 15 to higher transmission ratio (i.e. a step S204), with reference to FIG. 7, FIG. 7 discloses a schematic view of actions of lowering transmission ratio of the ECVT of the constant speed control device for a vehicle according to the present invention, wherein the first pulley 12 is adjusted to a larger pitch, and the second pulley 13 is automatically adjusted to a smaller pitch. When the electronic control unit 20 sends a signal to adjust the transmission-ratio control motor 15 to higher transmission ratio (i.e. the step S204), the transmission-ratio control motor 15 continues adjusting the first pulley 12 to larger pitch, and the process of the method returns to the step S201. If the electronic control unit 20 examines the vehicle speed signal 241 from the vehicle speed sensing device 24 is not lower than the constant speed value, the electronic control unit 20 will stop sending a signal to adjust the transmission-ratio control motor 15 for maintaining the transmission ratio (i.e. a step S205), and then returning to the step S201.

Therefore, when the vehicle speed is higher or lower than the constant speed value, the throttle locking device 26 will be locked to keep the opening degree of the throttle constant, and allow the rotation of the engine to be maintained at a rotation with better efficiency, so as to prevent incomplete combustion of fuel for thus reducing fuel consumption. In the meantime, the present invention uses the transmission-ratio control motor 15 to adjust the transmission ratio of the ECVT 10 to thus adjust the vehicle speed to be maintained at the constant speed value, so as to achieve an object of constant speed driving.

With reference to FIGS. 2 to 5, FIG. 5 further discloses a flow chart for mode quitting of the constant speed control method for a vehicle according to the present invention. When entering the constant speed mode (i.e. the step S104), the vehicle is driven at the constant speed mode, and the electronic control unit 20 synchronously keeps examining all kinds of signal to determine whether to quit the constant speed mode. In a step S301, the electronic control unit 20 examines if the accelerator opening-degree sensing device 23 sends an accelerator opening degree signal 231. When the electronic control unit 20 examines the variation of the accelerator opening degree signal 231 from the accelerator opening-degree sensing device 23 is out of a default value, then quits the constant speed mode (i.e. a step S307); in other words, when the driver intends to manipulate the accelerator manually, a throttle handle of a scooter is rotated over a certain momentum or a throttle pedal of a car is treadle over a certain momentum to produce an accelerator opening degree for increasing signals. Then, returning to the normal operation mode and quitting locking the throttle locking device 26, so as to return to normal driving state that controls the vehicle speed according to variation of the accelerator opening degree. When the electronic control unit 20 examines the variation of the accelerator opening degree signal is out of the default value, then goes to a step S302.

In the step S302, the electronic control unit 20 examines if the brake switch is activated, wherein when the electronic control unit 20 examines the brake switch sending a brake signal, then quitting the constant speed mode (i.e. the step S307); in other words, when using the brake switch 22, or using a brake lever or a brake pedal to produce a brake signal 221, then returning to the normal operation mode and quitting locking the throttle locking device 26, so as to return to the normal driving state that the driver controls the vehicle speed by the accelerator. When no brake signal is examined by the electronic control unit 20, then go to a step S303.

In the step S303, the electronic control unit 20 examines if the constant speed switch 21 is pressed again. When the electronic control unit 20 examines the constant speed switch 21 is pressed again (Yes of the step S303), then quitting the constant speed mode (i.e. the step S307); in other words, if the driver intends to quit the constant speed mode, the driver can press the constant speed switch 21 again, the vehicle then returns to the normal operation mode and quits locking the throttle locking device 26, so as to return to the normal driving state that the driver controls the vehicle speed by the accelerator. If the electronic control unit 20 does not examine that the brake switch 21 is pressed again (No of step S303), then going to a step S304.

In the step S304, when the electronic control unit 20 examines that the vehicle speed signal 241 from the vehicle speed sensing device 24 is higher than the preset highest vehicle speed value for entering the constant speed mode, then quitting the constant speed mode (i.e. the step 307); in other words, when the vehicle speed of the vehicle is higher than the highest vehicle speed value for entering the constant speed mode due to downhill or other factors, then returning to the normal operation mode and quitting locking the throttle locking device 26, so as to return to the normal driving state that the driver controls the vehicle speed by the accelerator. When the electronic control unit 20 examines that the vehicle speed signal 241 from the vehicle speed sensing device 24 is not higher than the preset highest vehicle speed value, then go to a step S305.

In the step S305, when the electronic control unit 20 examines the vehicle speed signal 241 from the vehicle speed sensing device 24 is lower than the preset lowest vehicle speed value for entering the constant speed mode, then quitting the constant speed mode (i.e. the step 307); in other words, when the vehicle speed of the vehicle is lower than the lowest vehicle speed value for entering the constant speed mode due to uphill, headwind or other factors, then returning to the normal operation mode and quitting locking the throttle locking device 26, so as to return to the normal driving state that the driver controls the vehicle speed by the accelerator. When the electronic control unit 20 examines that the vehicle speed signal 241 sent from the vehicle speed sensing device 24 is not lower than the preset lowest vehicle speed value, then keeping driving at the constant speed mode (i.e. a step S306).

As stated above, comparing to the shortcoming of the conventional method that changes the air flow and fuel sent to a combustion chamber by adjusting the opening degrees of the throttle valve and the fuel nozzle to achieve constant speed driving but cannot achieve the best combustion efficiency for the fuel in the combustion chamber, the present invention keeps the engine of the vehicle at a constant rotation speed with better combustion efficiency by maintaining the opening degree of the throttle valve constant, and changes the transmission ratio and maintains vehicle speed by adjusting the transmission-ratio control motor 15, which is indeed helpful for achieving an object of constant speed driving with better combustion efficiency and economizing on fuel.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A constant speed control method for a vehicle, wherein the constant speed control method for a vehicle comprises steps of:
examining whether a constant speed switch of the vehicle is pressed or not by an electronic control unit, and allowing the electronic control unit to enter a constant speed mode when the constant speed switch is pressed, wherein before entering the constant speed mode, the electronic control unit examines if a vehicle speed measured by a vehicle speed sensing device is in a predetermined range, and then enters the constant speed mode when the speed is in the predetermined range; and
sending a signal by the electronic control unit, so as to lock a throttle locking device for maintaining an opening degree of a throttle valve and to adjust an transmission ratio of an electric continuously variable transmission (ECVT) for maintaining the constant speed driving of the vehicle, wherein the ECVT has a transmission-ratio control motor and a pulley assembly, and the electronic control unit examines if the vehicle speed is higher or lower than a constant speed value, wherein the transmission-ratio control motor adjusts the pulley assembly to a low transmission ratio when the vehicle speed is higher than the constant speed value; or the transmission-ratio control motor adjusts the pulley assembly to a high transmission ratio when the vehicle speed is lower than the constant speed value.

2. The constant speed control method for a vehicle as claimed in claim 1, wherein the method further has a step of: examining if an accelerator opening-degree sensing device sends an opening degree signal of an accelerator by the electronic control unit, and quitting the constant speed mode when variation of the opening degree is larger than a default value.

3. The constant speed control method for a vehicle as claimed in claim 1, wherein the method further has a step of: examining if a brake switch is activated by the electronic control unit, and quitting the constant speed mode when the brake switch is activated.

4. The constant speed control method for a vehicle as claimed in claim 1, wherein the method further has a step of: examining if a constant speed switch is pressed again by the electronic control unit, and quitting the constant speed mode when the constant speed switch is pressed again.

5. A constant speed control device for a vehicle, comprising an electronic control unit, an electric continuously variable transmission (ECVT), a constant speed switch and a speed sensor, wherein the constant speed control device further comprises:
a throttle locking device, wherein the electronic control unit locks the throttle locking device when the constant speed switch is pressed, so as to maintain an opening degree of a throttle valve and adjust a transmission ratio of the ECVT, with the result that the vehicle moves at a constant speed;
the ECVT has a transmission-ratio control motor and a pulley assembly; and
the pulley assembly has a first pulley and a second pulley; the transmission-ratio control motor is used to adjust the first pulley, so as to adjust a transmission ratio of the first pulley relative to the second pulley.

6. The constant speed control device for a vehicle as claimed in claim 5, wherein the constant speed control device further has a brake switch electrically connected to the electronic control unit.

7. The constant speed control device for a vehicle as claimed in claim 5, wherein the constant speed control device further has a display device electrically connected to the electronic control unit.

* * * * *